Patented June 10, 1952

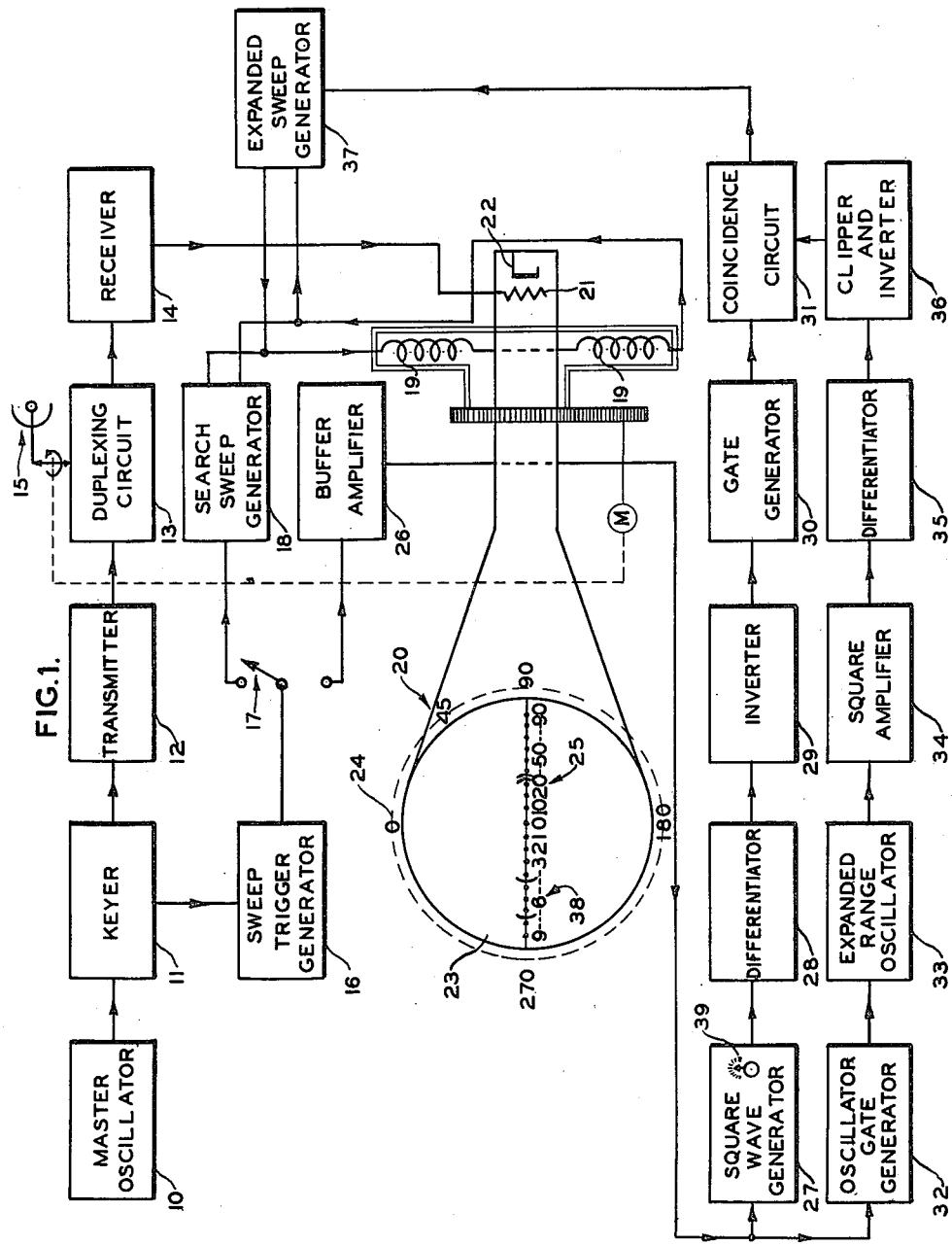

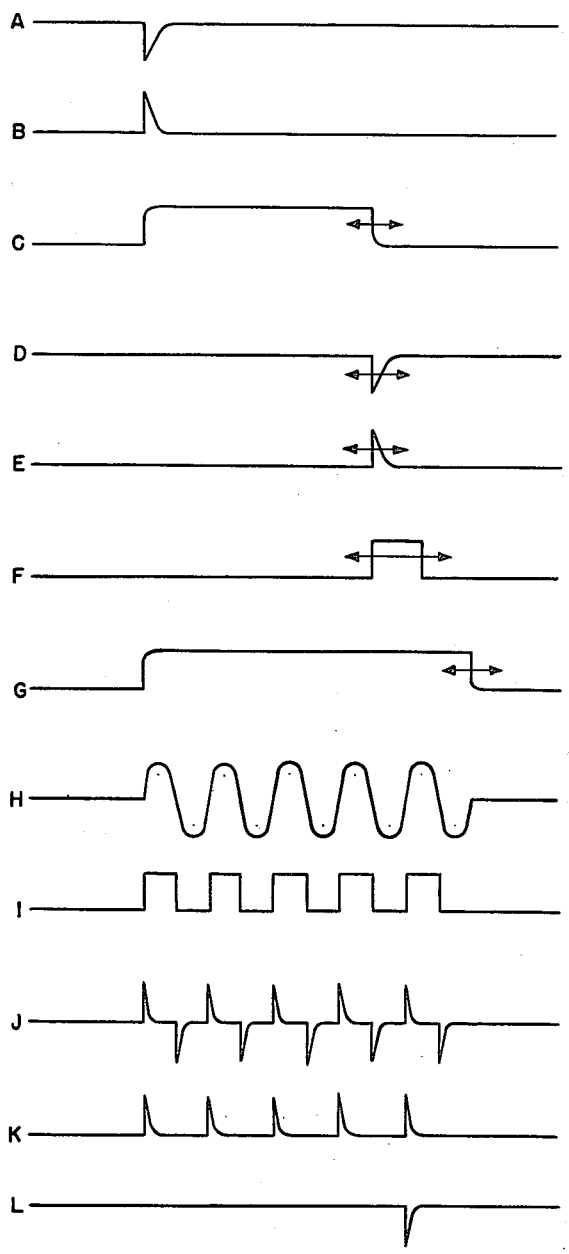

2,600,335

UNITED STATES PATENT OFFICE 2,600,335

RADAR DISPLAY

Edwin G. Schneider, Lexington, Mass., assignor, by mesne assignments, to the United States of America as represented by the Secretary of War Original application February 3, 1945, Serial No. 576,115, now Patent No. 2,555,163, dated May 29, 1951. Divided and this application July 22, 1948, Serial No. 40,143

4 Claims. (Cl. 343—11)

This invention relates generally to control of the display by varying the time of initiating the sweep of the electron beam of a cathode ray indicator tube utilized in radio object locating equipment to display azimuth and range information.

This application is a division of my application Serial Number 576,115, filed February 3, 1945, now Patent Number 2,555,163, dated May 29, 1951.

Certain types of radio object locating equipment are provided with a cathode ray tube indicator having a radial sweep reaching from the center of the screen to the periphery and rotated about the tube axis. The reflected echoes control the electron beam intensity so that reflecting objects produce an indication on the screen having an angular position corresponding to the azimuth of the detected object, and having a distance from the center of the screen corresponding to the range of the object. This type of display is known as plan position indication (P. P. I.).

One of the objects of this invention is to expand the indicator sweep so that a selected portion of the range is spread over the entire indicator screen.

This system has been tested and found highly successful in radio object locating equipment SCR 615A, and has been adapted to various other equipment of similar nature.

Other objects will be apparent from a study of the following specification, taken in connection with the accompanying drawing, in which:

Fig. 1 is a block diagram of a radio object locating apparatus utilizing a P. P. I. display and assembled in accordance with the principles of this invention; and Fig. 2 shows the approximate wave shapes of the output of the major components of said system.

Referring now more particularly to Fig. 1 of the drawing, a master oscillator 10 is provided having a sine wave output of a frequency depending upon the maximum effective range of the system. Assuming that said maximum range is 100 miles, a pulse frequency or repetition rate of 930 C. P. S. is suitable to allow a radio pulse to reach a target at the maximum effective range and permit any echo thereof to be received back by the equipment before the transmission of the next radio pulse.

The sine wave output of oscillator 10 is distorted in a keyer 11 to obtain narrow flat top pulses. The pulse output of keyer 11 is applied in part to a radio frequency oscillator or transmitter 12 whereby short pulses of radio frequency energy are obtained which, through a duplexing circuit 13 may be conveyed to a highly directional antenna system 15 adapted to be rotated, preferably continuously through 360° of azimuth. Duplexing circuit 13 is a switch for connecting transmitter 12 to antenna 15 during the transmission of pulses and for connecting receiver 14 to antenna 15 during alternate periods in order to protect receiver 14 from undue shock during transmission periods. The antenna system 15 may comprise suitable dipole radiating elements and an appropriate parabolic reflector, designed to concentrate the transmitted energy into a relatively narrow beam.

The output of the keyer 11 is also utilized to control the operation of a suitable circuit 16 adapted to generate sharp triggering pulses which, through a manually operated switching arrangement 17, may be applied to a sweep generator 18. The output of the latter, a sawtooth current, is applied to deflecting coils 19 rotatable about the neck of a cathode ray tube 20 at a rate corresponding to that of the rotation of the antenna system 15. By this arrangement the screen of the indicator tube 20 is provided with a radial electron beam trace commencing at its center and extending to its periphery.

The above described trace is rotated about its origin in synchronism with the azimuthal scanning of the antenna system 15. The radial trace and antenna system are both initially aligned with zero degrees azimuth, corresponding to transmission in a reference direction, for example, north. IIn the example being described the trace represents 100 miles, and therefore the generator 18 should be designed so that the time base output thereof is equal to 1075 microseconds.

When transmitted radio pulses encounter a reflecting object, echoes are received by the antenna system 15 and conveyed through the duplexing circuit 13 to the receiver 14, where they are demodulated and then applied to the control grid 21 of the indicator 20. Thus, the electron beam emanating from the cathode 22 of the tube 20 becomes intensity-modulated and there appear on the sensitized screen 23 of said tube, short arcs whose positions depend, as hereinbefore stated, upon the respective azimuths and ranges of the reflecting objects. The indicator screen may be calibrated about its periphery, as at 24, in terms of azimuth, and along a reference diameter, as at 25, in terms of range.

In Fig. 1 of the drawings, two target indications are shown on the right-hand side of the screen 23, their particular position being merely illustrative. It will be noted that both indications are between the 30 and 40 mile markers on the range scale 25. The range of neither target can be discerned with any great particularity.

The features of the invention which enables these detected objects to be more closely examined to permit their ranges to be determined with increased accuracy will now be described. For this purpose, reference will be made to the wave shapes shown in Fig. 2 of the drawing as well as to the block diagram of Fig. 1.

At A in Fig. 2, there is diagrammatically represented the pulse output of the sweep trigger generator 16. As above stated, this output is fed to the switch 17, in one of the positions of which, here shown as the upper, said output is applied to the search sweep generator 18. In the other position of said switch, the trigger pulse output of the generator 16 is applied to a conventional buffer amplifier 26, where it is inverted, as shown in Fig. 2B.

The positive-going pulses thus obtained which, it will be recalled, are synchronized with the radio pulse transmission, are applied in part to any preferred, highly accurate rectangular wave generator 27 for producing positive-going rectangular waves of selectively variable width, as shown in Fig. 2C. Such rectangular wave generators are well known in the art, an example thereof being shown on page 176 and Figs. 4–9 in "Ultra High Frequency Techniques" by Brainerd, Koehler, Reich, and Woodruff, published by D. Van Nostrand Co., Inc., in 1942. Generator 27 may be provided with a selector switch 39 for adjusting the length of the rectangular wave produced.

The adjustable lagging edge of the rectangular wave produced by generator 27 is then differentiated in a circuit 28 having a short time constant, to obtain the sharp triggering pulses shown at D in Fig. 2, said pulses then being inverted by a conventional inverter amplifier 29 to obtain the positive-going pulses shown at E in Fig. 2. These pulses are utilized to trigger a gate generator 30 producing a positive-going rectangular output wave. Generator 30 may be similar to generator 27, except that it produces rectangular waves of fixed width. In the case under consideration, the waves may have a width of approximately 107.5 microseconds, which is the time required for the radio pulses to travel out and be reflected back over 10 miles, the distance to be represented by the expanded sweep referred to in the earlier portions of this specification.

The resulting rectangular enabling wave or gate, diagrammatically shown in Fig. 2F, is adjustable in phase or time relation with respect to the radio pulse transmission and is applied to one of the control elements of a normally inoperative standard coincidence circuit 31 to condition said circuit for operation at any time within the period of said gate. Such coincidence circuits are well known in the art and may comprise an electron tube operated with a bias rendering it inoperative unless it is supplied with two pulses, additively and simultaneously, one pulse alone not being sufficient to render the tube operative. Each of the two pulses may be applied to a different electrode of the electron tube.

It will be noted from the description thus far that, by adjusting the width of the output wave (Fig. 2C) of the rectangular wave generator 27, by means of selector switch 39, the application of the gate (Fig. 2F) to the coincidence circuit 31 may be delayed by any desired interval which, for example, may be the sum of increments of time representing 10 miles of range.

I shall now set forth the manner in which the coincidence circuit 31, after conditioning as just described, is rendered operative to enable triggering of the expanded sweep.

For this purpose, the output of the buffer amplifier 26 in addition to being applied to the rectangular wave generator 27, is also applied to an oscillator gate generator 32, which is similar to generator 27 and has a positive-going rectangular output wave of adjustable width as shown at G in Fig. 2. This output is applied to a conventional normally inoperative stable oscillator 33, which, for the duration of said rectangular output wave, generates a sine wave, shown in Fig. 2H, the frequency of which is a submultiple of the frequency or pulse repetition rate of the transmitted radiant energy. In the embodiment described, the frequency of oscillator 33 is 9300 C. P. S., corresponding to a period of 107.5 microseconds.

The positive alternations of said sine waves are distorted by a squarer-amplifier 34 to obtain the square-wave train shown in Fig. 2I. Squaring circuits are well known in the art and may consist of a top-clipper tube followed by an amplification stage.

The wave shown in Fig. 2I is differentiated in a circuit 35, Fig. 1, as shown in Fig. 2J, and is then clipped and inverted in an appropriate circuit 36, to obtain the trigger pulses shown diagrammatically in 2K. These pulses are separated by the exact time required for the radio pulses to travel out and be reflected back over 10 miles, the distance to be represented by the expanded sweep trace.

The pulse output of the clipper-inverter 36 is applied to the second control element of the coincidence circuit 31, and whichever pulse occurs during the period when said coincidence circuit is conditioned for operation as above described by the gate shown in Fig. 2F, causes said circuit to pass said pulse, as shown in Fig. 2L. The latter pulse triggers an expanded sweep generator 37, Fig. 1, adapted to produce a sawtooth current whose period is, in the case being considered, 107.5 micro-seconds, representing a range of 10 miles. The output of the expanded sweep generator has a wave form similar to that of the search sweep generator applied to the deflecting coils 19 of the cathode-ray indicator tube 20.

The range scale on screen 23 of indicator tube 20 relating to the expanded sweep, which is shown on the left-hand side of the screen 23, may be calibrated in terms of range, as shown at 38.

Assuming that the delay introduced by the square wave generator 27 is 322.5 microseconds, which is the time required for the radio pulses to travel out and be reflected back over 30 miles, the commencement of the expanded sweep will have been delayed by that amount of time, so that the trace appearing upon the indicator screen will represent the 10-mile region of space between 30 and 40 miles from the radio-echo equiment. And, it will be noted that the expanded sweep now enables an accurate determination of the ranges of the detected targets. Inspection of the display indicates that the two targets hereinbefore referred to, which were known to be merely somewhere between 30 and 40 miles distant, are actually 34.5 and 37.5 miles distant, respectively.

The foregoing is a description of a preferred embodiment of my present invention, and it will be noted from all of the foregoing that I have provided a simple circuit arrangement for examining closely any selected region of the total range of a P. P. I. object locating system, particularly an early warning system, whereby the ranges of distant targets detected during normal searching may be determined with greater accuracy than has heretofore been possible.

Other advantages of my present invention will readily occur to those skilled in the art to which the same relates.

What is claimed is:

1. A pulse echo object locating system comprising means to radiate pulses into space, means to receive echoes of said pulses reflected by objects to be detected, at least one of said means having a directive characteristic, means to vary said directive characteristic for each successive pulse, means to generate time loci on a modified polar coordinate display corresponding in direction to said directive characteristic, means responsive to said receiving means for causing visible indications on said display along said loci upon receipt of an echo, means to synchronize said radiated pulses in predetermined time relation to the generation of said time loci including means to delay the initiation of the generation of said time loci by a predetermined variable time after radiation of each pulse, whereby a positional presentation of the reflecting objects is formed on said display, omitting objects within the distance corresponding to said time to provide a detailed presentation of objects beyond said distance.

2. A pulse echo object locating system comprising means to radiate pulses into space, means to receive echoes of said pulses reflected by objects to be detected, at least one of said means having a directive characteristic, means to vary said directive characteristic for each successive pulse, means to generate time loci from a point of origin on a modified polar coordinate display in a direction corresponding to said directive characteristic, said receiving means causing visible indication on said display along said loci upon receipt of an echo, means to synchronize said radiated pulses in predetermined time relation to the generation of said time loci including means to delay the initiation of the generation of said time loci by a predetermined variable time after radiation of each pulse, whereby a map-like presentation of the reflecting objects on said display is distorted to omit objects within the distance corresponding to said time and to provide a detailed presentation of objects beyond said distance.

3. A pulse echo object locating system according to claim 1, wherein said time loci are radial sweep traces.

4. A pulse echo object locating system according to claim 2, wherein said time loci are radial sweep traces.

EDWIN G. SCHNEIDER.

REFERENCES CITED

The following references are of record in the file of this patent:

UNITED STATES PATENTS

| Number | Name | Date |
| --- | --- | --- |
| 2,395,966 | Goldberg | Mar. 5, 1946 |
| 2,422,204 | Meacham | June 17, 1947 |
| 2,426,217 | Hoisington | Aug. 26, 1947 |
| 2,426,989 | De Rosa | Sept. 9, 1947 |
| 2,453,711 | Isbister et al. | Nov. 16, 1948 |
| 2,454,782 | De Rosa | Nov. 30, 1948 |
| 2,461,998 | Patterson | Feb. 15, 1949 |
| 2,468,032 | Busignies | Apr. 26, 1949 |
| 2,471,516 | Bryant | May 31, 1949 |